United States Patent
Williams et al.

(10) Patent No.: US 11,913,381 B1
(45) Date of Patent: Feb. 27, 2024

(54) FORCE MODIFICATION OF PASSIVE SPOOL FOR CONTROL OF SECONDARY NOZZLE CIRCUITS

(71) Applicant: Hamilton Sundstrand Corporation, Charlotte, NC (US)

(72) Inventors: Brandon P. Williams, Johnston, IA (US); Jason A. Ryon, Carlisle, IA (US); Todd Haugsjaahabink, Amherst, MA (US); Murtuza Lokhandwalla, South Windsor, CT (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/896,448

(22) Filed: Aug. 26, 2022

(51) Int. Cl.
| | |
|---|---|
| *F16K 31/06* | (2006.01) |
| *F02C 7/232* | (2006.01) |
| *F16K 31/04* | (2006.01) |
| *F16K 31/42* | (2006.01) |

(52) U.S. Cl.
CPC .............. *F02C 7/232* (2013.01); *F16K 31/04* (2013.01); *F16K 31/0613* (2013.01); *F16K 31/426* (2013.01)

(58) Field of Classification Search
CPC ..... F02C 7/232; F16K 31/04; F02M 21/0248; F02M 41/00; F02M 47/00
See application file for complete search history.

(56) References Cited

U.S. PATENT DOCUMENTS

| | | | |
|---|---|---|---|
| 3,728,859 | A | 4/1973 | Seiler |
| 4,655,912 | A | 4/1987 | Bradley et al. |
| 4,817,389 | A * | 4/1989 | Holladay ................ F02C 7/228 60/746 |
| 4,962,887 | A | 10/1990 | Matsuoka |
| 5,257,502 | A | 11/1993 | Napoli |
| 5,339,636 | A | 8/1994 | Donnelly et al. |
| 5,417,054 | A | 5/1995 | Lee et al. |
| 5,732,730 | A | 3/1998 | Shoemaker et al. |
| 6,119,960 | A | 9/2000 | Graves |
| 7,255,290 | B2 | 8/2007 | Bright et al. |
| 8,316,630 | B2 | 11/2012 | Futa et al. |
| 8,347,599 | B2 | 1/2013 | Scully |
| 8,387,400 | B2 | 3/2013 | Goeke et al. |
| 8,483,931 | B2 | 7/2013 | Williams et al. |
| 8,666,632 | B2 | 3/2014 | Zebrowski et al. |
| 8,677,754 | B2 | 3/2014 | Lueck et al. |
| 8,807,463 | B1 | 8/2014 | McAlister |

(Continued)

*Primary Examiner* — Kelsey E Cary
(74) *Attorney, Agent, or Firm* — Locke Lord LLP; Joshua L. Jones; Scott D. Wofsy

(57) ABSTRACT

A system includes an injector having a scheduling valve assembly and a nozzle in fluid communication with the valve assembly. The scheduling valve assembly is configured for regulation of flow from an inlet of the injector to the nozzle. The injector includes two fluid circuits between the inlet of the injector and two respective outlets of the nozzle for staged flow output from the nozzle. A first one of the two fluid circuits is a primary circuit, and a second one of the two fluid circuits is a secondary circuit. A solenoid valve is connected in fluid communication with the scheduling valve assembly, wherein the solenoid valve is configured to adjust position of a hydromechanical valve spool of the valve assembly.

16 Claims, 4 Drawing Sheets

(56) References Cited

U.S. PATENT DOCUMENTS

| | | |
|---|---|---|
| 8,820,087 B2 | 9/2014 | Ryan |
| 9,121,349 B2 | 9/2015 | Griffiths et al. |
| 9,234,465 B2 | 1/2016 | Futa et al. |
| 9,488,107 B2 | 11/2016 | Rodrigues et al. |
| 9,840,992 B2 | 12/2017 | Duncan et al. |
| 10,041,411 B2 | 8/2018 | Chabaille et al. |
| 10,174,948 B2 | 1/2019 | Hill |
| 10,288,294 B2 | 5/2019 | Griffiths et al. |
| 10,408,131 B2 | 9/2019 | Thompson et al. |
| 10,465,908 B2 | 11/2019 | Stevenson et al. |
| 10,487,957 B2 | 11/2019 | Bleeker et al. |
| 10,502,138 B2 | 12/2019 | Reuter et al. |
| 10,982,858 B2 | 4/2021 | Bickley |
| 11,067,278 B2 | 7/2021 | Prociw et al. |
| 11,215,121 B2 | 1/2022 | Stevenson |
| 11,371,439 B2 | 6/2022 | Di Martino et al. |
| 11,408,347 B2 | 8/2022 | Reuter et al. |
| 11,408,348 B2 | 8/2022 | Culwick |
| 11,421,600 B1 | 8/2022 | Reuter et al. |
| 11,549,687 B2 | 1/2023 | Griffiths et al. |
| 11,643,970 B2 | 5/2023 | Baker et al. |
| 2003/0093998 A1 | 5/2003 | Michau et al. |
| 2005/0224598 A1* | 10/2005 | Potz ............... F02M 45/00 239/88 |
| 2006/0144964 A1* | 7/2006 | Boecking ......... F02M 45/086 239/533.2 |
| 2006/0236974 A1* | 10/2006 | Randall ........... F02D 19/0694 123/304 |
| 2009/0173810 A1 | 7/2009 | Rodrigues et al. |
| 2009/0204306 A1 | 8/2009 | Goeke et al. |
| 2009/0234555 A1 | 9/2009 | Williams et al. |
| 2009/0277185 A1 | 11/2009 | Goeke et al. |
| 2010/0005776 A1 | 1/2010 | Lueck et al. |
| 2010/0037615 A1 | 2/2010 | Williams et al. |
| 2010/0050593 A1 | 3/2010 | Futa et al. |
| 2010/0058770 A1 | 3/2010 | Ryan |
| 2012/0261000 A1 | 10/2012 | Futa et al. |
| 2013/0042920 A1 | 2/2013 | Snodgrass et al. |
| 2013/0061599 A1 | 3/2013 | Van Alen |
| 2014/0034023 A1* | 2/2014 | Coldren ........... F02M 21/0257 123/472 |
| 2014/0311455 A1* | 10/2014 | Kim .................. F02D 19/10 239/408 |
| 2015/0096301 A1 | 4/2015 | Chabaille et al. |
| 2015/0292412 A1 | 10/2015 | Rodrigues et al. |
| 2016/0017808 A1 | 1/2016 | Chabaille et al. |
| 2016/0230904 A1 | 8/2016 | Zarrabi et al. |
| 2016/0298851 A1 | 10/2016 | Brickwood et al. |
| 2017/0268781 A1 | 9/2017 | Stevenson et al. |
| 2018/0066588 A1 | 3/2018 | Daly et al. |
| 2018/0163635 A1 | 6/2018 | Marocchini et al. |
| 2018/0163637 A1 | 6/2018 | Griffiths |
| 2018/0163966 A1 | 6/2018 | Jones et al. |
| 2018/0291831 A1* | 10/2018 | Hirano ............... F02D 41/3845 |
| 2018/0372321 A1 | 12/2018 | Yates et al. |
| 2018/0372323 A1 | 12/2018 | Griffiths |
| 2021/0017908 A1 | 1/2021 | Di Martino et al. |
| 2021/0018177 A1 | 1/2021 | Griffiths et al. |
| 2023/0050741 A1 | 2/2023 | Xuening et al. |

\* cited by examiner

FORCE MODIFICATION OF PASSIVE SPOOL FOR CONTROL OF SECONDARY NOZZLE CIRCUITS

BACKGROUND

1. Field

The present disclosure relates to injectors and nozzles, and more particularly to fuel injection such as in gas turbine engines.

2. Description of Related Art

Conventional fuel injectors that contain flow scheduling valves are passive, where the flow response is fully based on the input pressure. A resistive spring provides the force balance to limit the rate at which the schedule valve opens. These valves can be used to divide flow as well, providing multiple flow paths that can be sequenced/schedule based on inlet fuel pressure, valve open area, and any downstream flow devices such as atomizers. At relatively low flow conditions, the flow schedule valve is largely responsible for most of the metering and therefore consumes/requires the majority of the fuel pressure. At relatively high flow conditions, there is a transition of pressure drop from the valve to other components downstream of the valve. Gas turbine combustors will typically have a natural frequency that may become excited when a certain heat release is attained. Quite often, this is at ground conditions; however, it can also be a concern at multiple flow conditions. This condition can cause significant levels of noise and occasionally may negatively impact the health of the structural components within and around the combustor.

To mitigate this noise, adjustments to fuel scheduling may be directed, in an attempt to decouple the heat release and noise; however, these attempts require additional flow dividing hardware and fuel manifolds adding significant cost, weight, and power requirements.

The conventional techniques have been considered satisfactory for their intended purpose. However, there is an ever present need for improved systems and methods for adjusting flow in passive injection valves. This disclosure provides a solution for this need.

SUMMARY

A system includes an injector having a scheduling valve assembly and a nozzle in fluid communication with the valve assembly. The scheduling valve assembly is configured for regulation of flow from an inlet of the injector to the nozzle. The injector includes two fluid circuits between the inlet of the injector and two respective outlets of the nozzle for staged flow output from the nozzle. A first one of the two fluid circuits is a primary circuit, and a second one of the two fluid circuits is a secondary circuit. A solenoid valve is connected in fluid communication with the scheduling valve assembly, wherein the solenoid valve is configured to adjust position of a hydromechanical valve spool of the valve assembly.

The valve spool can be biased to a closed position by one or more biasing members of the scheduling valve assembly. The valve spool can be configured to regulate flow from the inlet of the injector to each of the primary and secondary circuits. The valve spool can include a scheduling surface configured to vary flow area through the secondary circuit based on position of the valve spool within the scheduling valve assembly.

The solenoid valve can have an inlet, an outlet, and a solenoid valve member configured to control flow through the solenoid valve from the inlet to the outlet based on electrical power applied to an armature of the solenoid valve. The inlet of the solenoid valve can be connected in fluid communication with the inlet of the injector. The outlet of the solenoid valve can be connected in fluid communication with the secondary circuit. The outlet of the solenoid valve can connect to the secondary circuit at a position in the secondary circuit that is downstream of the valve assembly.

The valve spool can include a piston with an orifice therethrough. The piston and orifice can be configured to regulate pressure differential across the valve assembly. The orifice can be in fluid communication in series between the inlet of the injector and the inlet of the solenoid valve.

The solenoid valve can be a three-way valve a first port in fluid communication with the secondary circuit. A second port can be in fluid communication with the inlet of the injector. A third port can be in fluid communication with the valve spool for selectively adjusting position of the valve spool in the valve assembly based on pressure from the inlet of the injector or pressure from the secondary circuit. The first port of the solenoid valve can be connected in fluid communication with a portion of the secondary circuit downstream of the valve spool. The third port can be in connected in fluid communication with a back piston of the valve spool.

The injector can be a first injector in a plurality of injectors each connected in fluid communication with a single manifold for supplying fuel to each injector in the plurality of injectors including the primary and secondary circuits of the first injector. A first sub-set of the plurality of injectors can be passive, simplex nozzles configured to issue fuel together with the secondary circuit of the first injector. The first injector can be a first injector in a second sub-set of the plurality of injectors. Each injector in the second sub-set can be as described above including a respective solenoid valve as described above connected thereto. A controller can be electrically connected to the solenoid valves for individual control thereof. It is also contemplated that a controller can be electrically connected to the solenoid valves for ganged control thereof. The first sub-set of injectors can be grouped circumferentially offset from the second sub-set of injectors.

The solenoid valve can instead be a binary valve, a modulating valve, a motorized valve, or any other suitable type of valve, e.g. separate from the scheduling valve. Loss of electrical power to the separate valve causes the valve spool to return to a position determined by mechanical components and regulates fuel flow as per a scheduling surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
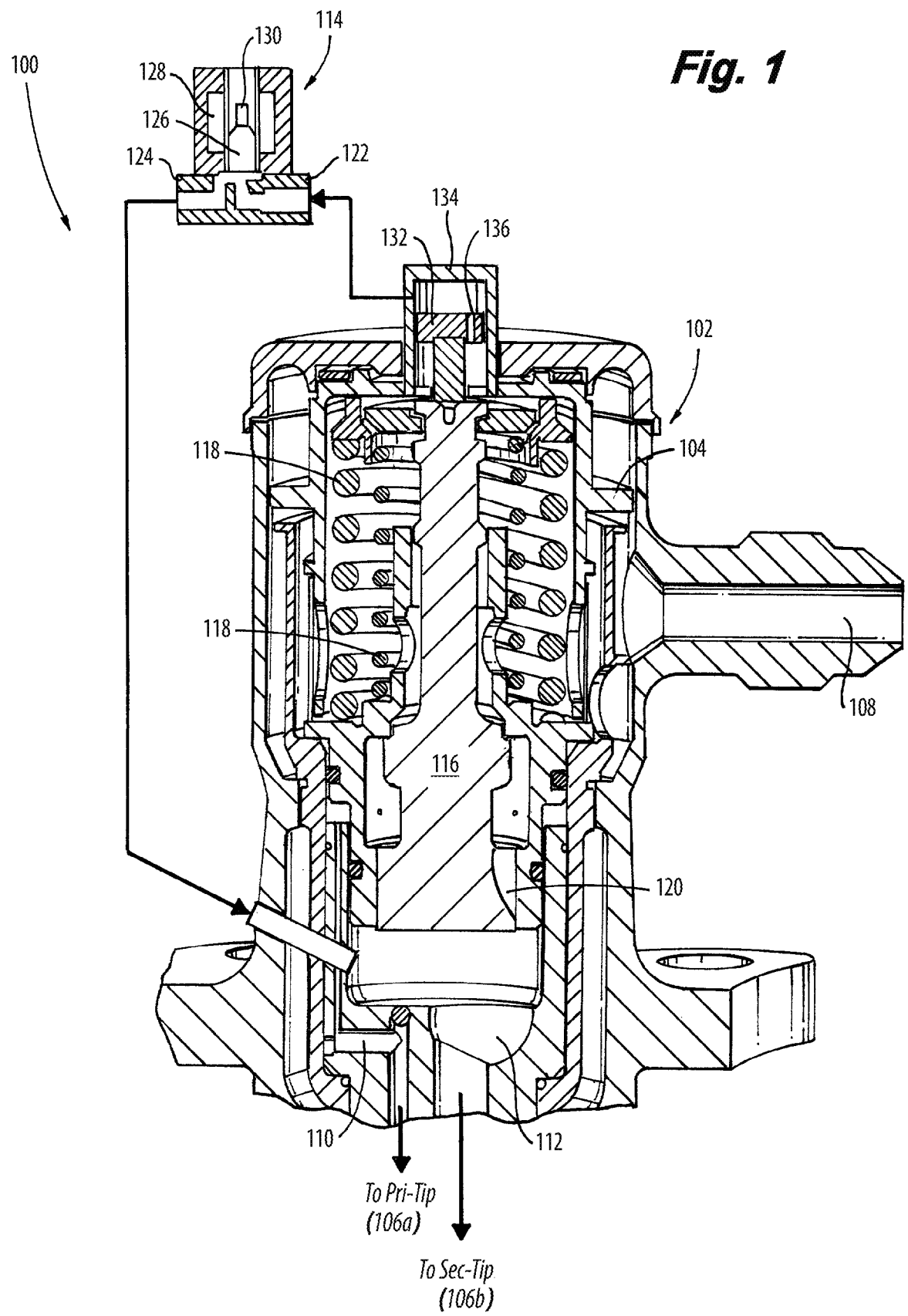
FIG. 1 is a schematic cross-sectional perspective view of a portion an embodiment of a system constructed in accordance with the present disclosure, showing the solenoid connected to adjust position of the otherwise passive hydromechanical valve spool.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide adjustment of otherwise passive valves, e.g. to provide active patternation in fuel injection for gas turbine engines.

The system 100 includes an injector 102 having a scheduling valve assembly 104 and a nozzle 106 (labeled in FIG. 2) in fluid communication with the valve assembly 104. The scheduling valve assembly 104 is configured for regulation of flow from an inlet 108 of the injector 102 to the nozzle 106 (labeled in FIG. 2). The injector 102 includes two fluid circuits 110, 112 between the inlet 108 of the injector and two respective outlets 106a, 106b of the nozzle 106 for staged flow output from the nozzle 106 (labeled in FIG. 2). A first one of the two fluid circuits 110, 112 is a primary circuit 112, and a second one of the two fluid circuits 110, 112 is a secondary circuit 110. A solenoid valve 114 is connected in fluid communication with the scheduling valve assembly 104. The solenoid valve 114 is configured to adjust position of a hydromechanical valve spool 116 of the valve assembly 104.

The valve spool 116 is biased to a closed position, i.e. it is biased upward as oriented in FIG. 1, by one or more biasing members 118 of the scheduling valve assembly 104. The valve spool 116 is configured to regulate flow from the inlet 108 of the injector 102 to each of the primary and secondary circuits 110, 112. The valve spool 116 includes a scheduling surface 120 configured to vary flow area through the secondary circuit 112 based on position of the valve spool 116 within the scheduling valve assembly 104, i.e. as the valve spool 116 moves back and forth in the vertical direction as oriented in FIG. 1. A scheduling valve with a scheduling surface is described in U.S. Pat. No. 5,732,730 which is incorporated by reference herein in its entirety.

The solenoid valve 114 has an inlet 122, an outlet 124, and a solenoid valve member 126 configured to control flow through the solenoid valve 114 from the inlet 122 to the outlet 124 based on electrical power applied to an electromagnetic coil 128 to apply a force on an armature 130 of the solenoid valve 114 that drives the valve member 126. The inlet 122 of the solenoid valve 114 is connected in fluid communication with the inlet 108 of the injector 102. The outlet 124 of the solenoid valve 114 is connected in fluid communication with the secondary circuit 112 at a position in the secondary circuit 112 that is downstream of the valve assembly 104.

The valve spool 116 includes a piston 132 in a piston chamber 134. An orifice 136 is defined through the piston 132 in the axial direction of movement of the piston 132. The piston 132 and orifice 136 are configured to regulate pressure differential across the valve assembly 104, e.g. the piston 132 and orifice 136 are sized to minimize the flow allowed to bypass the spool 116 and gain a change in the sensed diameter of the spool 116 while achieving the desired level of flow control change. The orifice 136 is in fluid communication in series between the inlet 108 of the injector 102 and the inlet 122 of the solenoid valve 114. The piston 132 is connected to the valve spool 116, e.g. as part of the valve spool 116.

Figure 2:
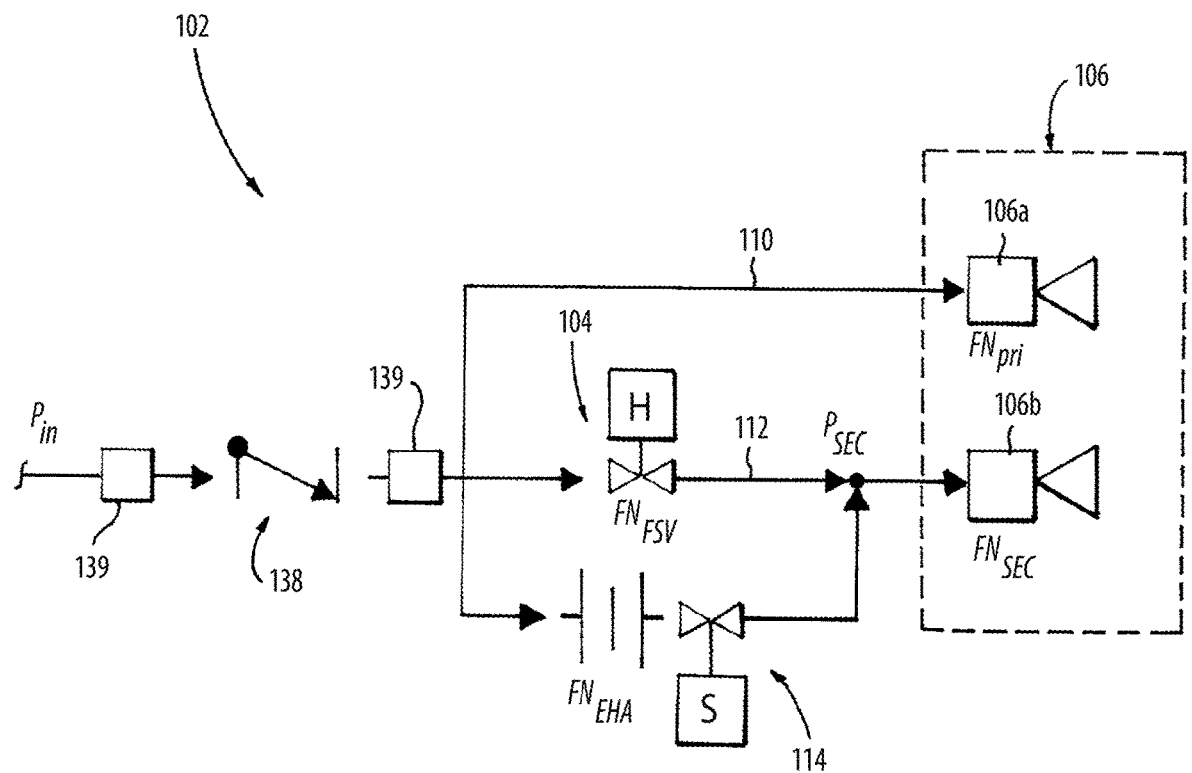
FIG. 2 is a schematic view of the system of FIG. 1, showing flow for the primary and secondary fluid circuits.

With reference now to FIG. 2, the injector 102 is shown schematically. Fuel supplied from a manifold at P in can be regulated with a metering valve 138. One or more check valves 139 can be included upstream or downstream of the metering valve 138 to prevent leaking through the injector 102 when there is supposed to be no flow through the injector 102. The check valve 139 can be dedicated to the injector 102, or can be shared by several injectors 102. FIG. 2 shows the two fluid circuits 110, 112, and how the valve assembly 104 and solenoid valve 114 connect to the fluid circuits 110, 112. The solenoid valve 114 controls a bypass of the portion of the secondary circuit 112, namely the portion that passes through valve assembly 104. By using electrical control of the solenoid valve 114 to regulate how much flow passes therethrough, the flow from the solenoid valve 114 into the secondary circuit 112 bypassing the valve assembly 104 can be used to adjust the position of the valve spool 116 (shown in FIG. 1) up or down as oriented in FIG. 1. This gives fine control over the valve assembly 104, especially for fine control over the secondary fluid circuit 112. Moreover, the solenoid valve 114 can be sized to be smaller than is needed for full control authority over the valve spool 116 (labeled in FIG. 1), since the flow through the solenoid valve only needs to make adjustments to the position of the valve spool 116 of FIG. 1, which otherwise positions itself within the valve assembly 104 based on the pressure at the inlet 108 of the injector 102, P in . In the event of electrical power outage for the solenoid valve 114, there is no interference with the ordinary, passive operation of the valve spool 116 of FIG. 1.

Figure 3:
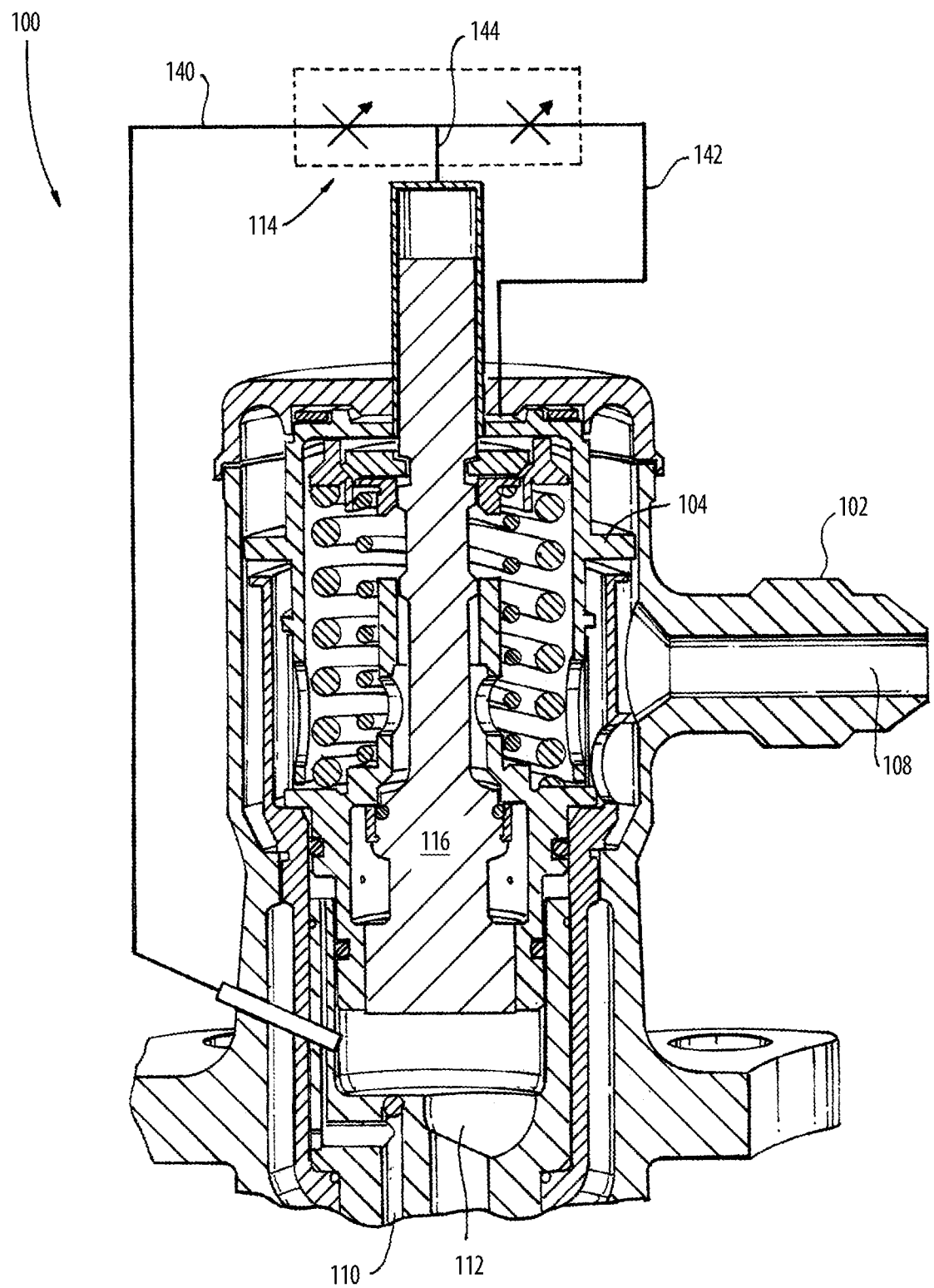
FIG. 3 is a schematic cross-sectional perspective view of another embodiment, showing a three-way solenoid valve connected to adjust the hydromechanical valve spool.

With reference to FIG. 3, another embodiment of an injector 102 is shown, with a similar valve assembly 104 to that described above, but with a three way solenoid valve 114. The solenoid valve 114 a three-way valve with a first port 140 in fluid communication with the secondary circuit 112. A second port 142 is in fluid communication with the inlet 108 of the injector 102. A third port 144 is in fluid communication with the valve spool 116 for selectively adjusting position of the valve spool 116 in the valve assembly 104 based on either pressure from the inlet 108 of the injector 102 or pressure from the secondary circuit 112 downstream of the valve assembly 104. The third port 144 is connected in fluid communication with a back piston 146 of the valve spool 116. Changing pressure in the piston chamber 148 of the back piston 146 by toggling between connecting the third port 144 to either the first port 140 or the second port 142 (which are at different respective pressures $P_{sec}$, the pressure of the secondary circuit 112 downstream of the valve assembly 104 and $P_{in}$, the inlet pressure of the injector 102, respectively) allows the three-way solenoid valve 114 in FIG. 3 to adjust the position of the valve spool 116 in the valve assembly 116 similar to the solenoid valve 114 described above with reference to FIG. 1, including passive operation in the event of electrical power outage.

Figure 4:
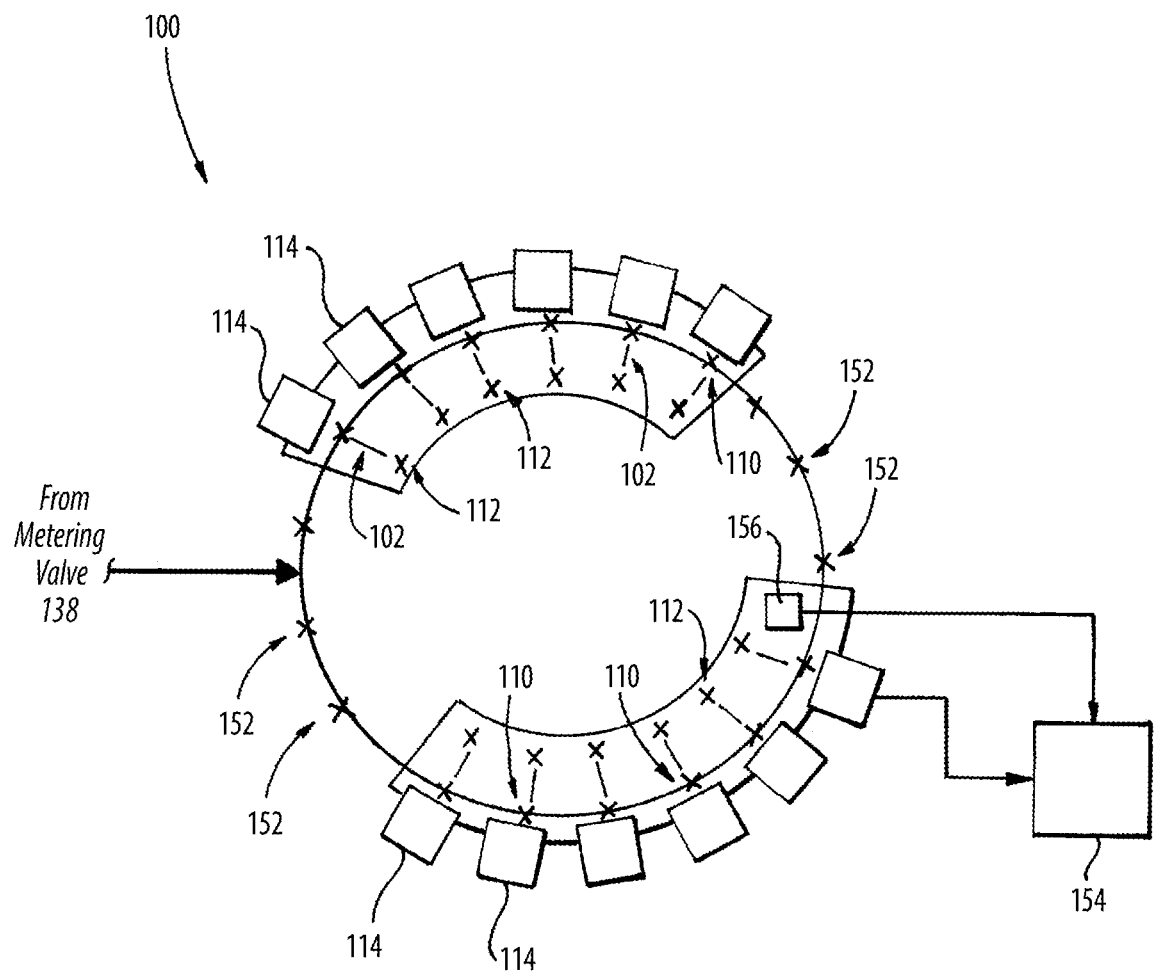
FIG. 4 is a schematic view of the system of FIG. 1, showing a plurality of injectors including passive and actuated nozzles distributed around a circumferential array, e.g. in a gas turbine engine.

With reference now to FIG. 4, the system 100 includes a plurality of duplex injectors 102, each with a solenoid valve 114 as shown in either FIG. 1 or 2. Each of the injectors 102 is connected in fluid communication with a single manifold 150 for supplying fuel to each injector 102 in the plurality of injectors 102 including the primary and secondary circuits 110, 112 of each injector 102. Another sub-set of injectors 152 are passive, simplex nozzles configured to issue fuel together with the secondary circuits 112 of the duplex injectors 102. A controller 154 is electrically connected to the solenoid valves 114 for individual control thereof (in FIG. 4, only one solenoid valve 114 is shown connected to the controller 154 for sake of clarity in the drawing). It is also contemplated that the controller 154 can instead be electrically connected to the solenoid valves 114 for ganged control thereof, i.e. where all the valves 114 receive the same command from the controller 154. The first sub-set of injectors 102 is grouped circumferentially offset from the second sub-set of injectors 152. In FIG. 4, there are two groups of three passive simplex injectors 152, separated circumferentially from one another by two sets of six duplex, solenoid controlled injectors 102. Those skilled in the art will readily appreciate that this circumferential arrangement can be modified as needed for a given engine application, that control of the injectors 102 as described herein allows for finely tuned control of the flame in a combustor that is fed by the injectors 102, 152, and that the solenoid controlled and passive injectors described here are an example and this disclosure applies to any other suitable combination of passive/active injectors. The control can be based on sensor feedback from one or more sensors 156 in the system 100. The solenoid valve can instead be a binary valve, a modulating valve, a motorized valve, or any other suitable type of valve, e.g. separate from the scheduling valve.

There are various potential benefits of systems and methods as disclosed herein, including the following. Failure modes of the solenoids add little if any additional risk for operation of the injectors. Loss (intentional or otherwise) of electrical power to the solenoid causes the valve spool to return to a position determined by the mechanical components and regulates fuel flow as per the scheduling surface. Systems and methods as disclosed herein allow for removal of the engine flow divider valve and subsequent fuel manifolds, fittings, and the like, and allow both primary and secondary circuits to be supplied by a single manifold while still providing active control. The valve assemblies 104 (labeled in FIG. 1) of the injectors 102 can work as a system. For example, if one valve is set to reduce flow, others can be opened to increase flow to compensate. Incorporation of the one or more sensors 156, e.g. mass-flow sensors, pressure sensor(s), and/or position sensors, can allow for health monitoring and active flow control. The valves can be gradually actuated to minimize potential pressure spikes within the fuel system 100.

The methods and systems of the present disclosure, as described above and shown in the drawings, provide for adjustment of otherwise passive valves, e.g. to provide active patternation in fuel injection for gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    an injector including a scheduling valve assembly and a nozzle in fluid communication with the valve assembly, wherein the scheduling valve assembly is configured for regulation of flow from an inlet of the injector to the nozzle, wherein the injector includes two fluid circuits between the inlet of the injector and two respective outlets of the nozzle for staged flow output from the nozzle, wherein a first one of the two fluid circuits is a primary circuit, and wherein a second one of the two fluid circuits is a secondary circuit; and
    a separate valve connected in fluid communication with the scheduling valve assembly, wherein the separate valve is configured to adjust position of a hydromechanical valve spool of the valve assembly, wherein the valve spool is biased to a closed position by one or more biasing members of the scheduling valve assembly, wherein the valve spool is configured to regulate flow from the inlet of the injector to each of the primary and secondary circuits, and wherein the valve spool includes a scheduling surface configured to vary flow area through the secondary circuit based on position of the valve spool within the scheduling valve assembly, wherein the separate valve is a solenoid valve that has an inlet, an outlet, and a solenoid valve member configured to control flow through the solenoid valve from the inlet to the outlet based on electrical power applied to an armature of the solenoid valve, wherein the inlet of the solenoid valve is connected in fluid communication with the inlet of the injector, and wherein the outlet of the solenoid valve is connected in fluid communication with the secondary circuit, wherein the outlet of the solenoid valve connects to the secondary circuit at a position in the secondary circuit that is downstream of the valve assembly.

2. The system as recited in claim 1, wherein the valve spool includes a piston with an orifice therethrough, wherein the piston and orifice are configured to regulate pressure differential across the valve assembly.

3. The system as recited in claim 2, wherein the orifice is in fluid communication in series between the inlet of the injector and the inlet of the solenoid valve.

4. The system as recited in claim 1, wherein the separate valve is a three-way valve including:
    a first port in fluid communication with the secondary circuit;
    a second port in fluid communication with the inlet of the injector; and
    a third port in fluid communication with the valve spool for selectively adjusting position of the valve spool in the valve assembly based on pressure from the inlet of the injector or pressure from the secondary circuit.

5. The system as recited in claim 4, wherein the first port of the separate valve is connected in fluid communication with a portion of the secondary circuit downstream of the valve spool.

6. The system as recited in claim 4, wherein the third port is connected in fluid communication with a back piston of the valve spool.

7. The system as recited in claim 1, wherein the injector is a first injector in a plurality of injectors each connected in fluid communication with a single manifold for supplying fuel to each injector in the plurality of injectors including the primary and secondary circuits of the first injector.

8. The system as recited in claim 7, wherein a first sub-set of the plurality of injectors are passive, simplex nozzles configured to issue fuel together with the secondary circuit of the first injector.

9. The system as recited in claim 8, wherein the first injector is a first injector in a second sub-set of the plurality of injectors, wherein each injector in the second sub-set is as recited in claim 1 including a respective separate valve as recited in claim 1 connected thereto.

10. The system as recited in claim 9, further comprising a controller electrically connected to the separate valves for individual control thereof.

11. The system as recited in claim 9, further comprising a controller electrically connected to the separate valves for ganged control thereof.

12. The system as recited in claim 9, wherein the first sub-set of injectors is grouped circumferentially offset from the second sub-set of injectors.

13. The system as recited in claim 1, wherein the separate valve is a binary valve.

14. The system as recited in claim 1, wherein the separate valve is a modulating valve.

15. The system as recited in claim 1, wherein the separate valve is a motorized valve.

16. The system as recited in claim 1, wherein loss of electrical power to the separate valve causes the valve spool to return to a position determined by mechanical components and regulates fuel flow as per a scheduling surface.

\* \* \* \* \*